Patented Apr. 21, 1936

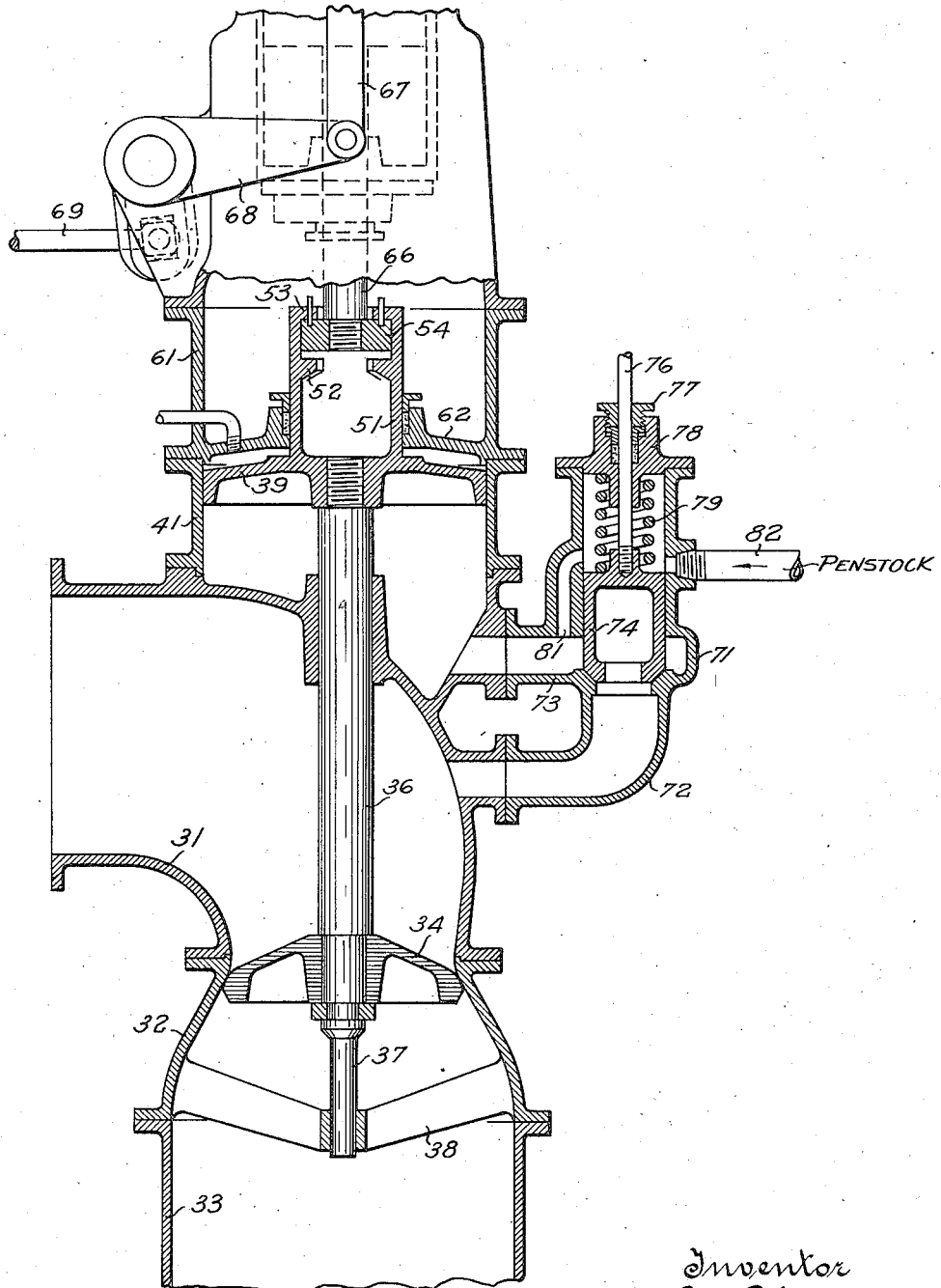

2,038,500

UNITED STATES PATENT OFFICE 2,038,500

PRESSURE REGULATOR

Arnold Pfau, Milwaukee, Wis., assignor to Allis-Chalmers Manufacturing Company, Milwaukee, Wis., a corporation of Delaware Application August 23, 1934, Serial No. 741,060

8 Claims. (Cl. 137—53)

This invention relates to improvements in regulators for limiting the rises of pressure in the fluid flowing to hydraulic turbines and relates more particularly to means for closing the regulator main valve after the pressure supplied to the turbine has been interrupted.

In pressure regulators such as herein disclosed in which the main or relief valve opens downwardly and is held up in closed position by hydraulic pressure opposing a downward pressure on the valve, when both pressures fail the weight of the valve pulls it down into the open position. The valve must then be raised into the closed position before normal pressure can again be supplied to the turbine. A source of pressure independent of the pressure conditions in the spiral casing or nozzle must therefore be provided to lift the valve. Such pressure may be obtained from the penstock upstream of the shutoff valve which, however, requires a long pipe of relatively large size. Means should accordingly be provided which will limit the quantity of and the length of time for which such auxiliary pressure is required. A particularly advantageous method is disclosed herein in which the auxiliary supply of pressure is shut off automatically when a direct supply of pressure, herein termed the main supply of pressure, is available in the casing to complete closing of the valve and to cause its retention in the closed position.

It is therefore an object of the present invention to provide means in connection with a pressure operated hydraulic pressure regulator to reduce the quantity of auxiliary pressure required to supply pressure for the purpose of initially closing the regulator relief valve.

Another object of the invention is to provide a valve controlling the initial supply of pressure to the fluid pressure actuated mechanism for operating a hydraulic regulator dependent on the pressure acting on the relief valve forming a portion of such regulator.

Another object of the invention is to provide a valve operable in one direction by mechanical means and operable in another direction by hydraulic means to control the closing of a fluid pressure operated pressure regulator for hydraulic turbines after interruption of the pressure normally supplied thereto during closure of the regulator valve.

Objects and advantages other than those above set forth will be apparent from the following description when read in connection with the accompanying drawing which somewhat diagrammatically illustrates one embodiment of the present invention in which the pressure operated operating means for closing the relief valve and the valve for controlling the supply of initiating and controlling pressure supply to such means are shown in vertical cross section.

Referring more particularly to the drawing by characters of reference, the reference numeral 31 designates a pipe elbow to be connected with a spiral casing of a hydraulic turbine (not shown) as is well known in the art. A pipe section 32 is connected with the elbow 31 at one end thereof and the other end of such section is connected with a discharge pipe 33 which is to be connected with the usual tailrace of the turbine. The section 32 forms a seat for a valve body 34 which is substantially disk shaped and which is movable downwardly within the pipe section 32 to allow discharge of water from the elbow 31. The valve disk 34 is attached to a valve stem 36 which is provided with a downwardly directed extension 37. The valve stem extension 37 is guided and retained in the central portion or hub of a spider 38 which is formed either integral with or is attached within the pipe section 32 as may be desired. The valve stem 36 extends upwardly through the wall of the elbow 31 and is provided with a piston 39 movable within a cylinder 41 mounted on the elbow. The piston 39 and the cylinder 41 form the servomotor portion of a pressure operated actuating means for closing the relief valve 34 when desired and are operable as will be described hereinafter. The piston 39 is provided with a hollow upwardly directed extension 51 which is formed with internal lugs 52 and is formed with an annular cover portion 53. The lugs 52 are so spaced from the end of the extension 51 as to form a chamber within which a disk 54 may move along the axis of the extension by a slight amount.

A member 61 is mounted on cylinder 41 and is provided with a bottom portion 62 forming the head of such cylinder. The piston extension 51, above mentioned, extends through the cylinder head 62 through a suitable sealing gland and is movable therein. The member 61 forms a support for the movable cylinder of a dashpot structure, preferably such as is disclosed in applicant's Patent No. 1,706,813 issued March 26, 1929 and assigned to the assignee of the present application, in which cylinder a piston is movable. A rod 66 of the dashpot piston extends through the bottom of the dashpot cylinder through a suitable sealing gland and is attached to the disk 54. A yoke 67 is connected with the other end of the dashpot piston rod 66 and is connected with a bell crank lever 68 which is pivotally mounted on the cylinder support 61 and is connected with a pushrod 69. The pushrod 69 is connected with and operable by the usual servo-motor for operating the penstock shutoff valve, the gate or the nozzle by which the fluid pressure is admitted to the turbine as is well known in the art.

The admission of pressure into the valve operating cylinder 41 below the piston 39 is controlled by a control valve which comprises a valve casing 71 connected with the pipe elbow 31 by a connection 72 and also connected with the operating cylinder 41 by a connection 73. The flow of fluid pressure from the elbow 31 through the connection 72 and through the connection 73 into the cylinder 41 is controlled by a valve body 74 which is operable within casing 71. The stem 76 of the valve 74 extends through a suitable sealing gland 77 in a cover 78 for valve casing 71. The valve 74 is biased into the position shown in the drawing by spring 79, or by other suitable means, compressed between the valve and the valve casing coverplate 78. The chamber above the valve 74 and within which the spring 79 is arranged, is connected by a passage 81 with the connection 73 and is likewise connected by a pipe 82 with a source of pressure independent of spiral casing pressure conditions such as the penstock at a point above the shutoff valve therein, such source of pressure being herein termed the auxiliary source.

The operation of the pressure regulator will now be described with particular reference to the operation and functions of the control valve and its effect on the remainder of the pressure regulator structure when the relief valve of the regulator is open and is to be closed in the absence of pressure in the elbow 31. When the penstock shutoff valve and supply line 82 are closed and the water below the valve in the spiral casing or nozzle pipe of the turbine is released, the pressure in the elbow 31 and in the cylinder 41 disappears and the control valve 74 is moved downwardly by the spring 79 to close off the connection 72. The weight of the relief valve 34, its stem 36, its operating piston 39 and all other portions of the structure connected therewith causes the relief valve 34 to open. If the penstock shutoff valve is now opened and unless the regulator is provided with means for shutting valve 34, the water discharged through the pressure regulator into the tailrace for some time while the turbine is in operation and thus works a hardship on the penstock shutoff valve. Pressure from the penstock is supplied through the pipe 82, the passageway 81 and the connection 73 to below the piston 39. Such pressure lifts the piston 39 and closes the valve 34. Discharge of the water through the pipe 33 then ceases and the pressure builds up in the elbow 31. Such pressure acts through the connection 72 on the control valve 74 which is lifted thereby compressing the spring 79 and shutting off the auxiliary supply of pressure through the passage 81 and the pipe 82 to below the piston 39 of the operating means for the relief valve. The main pressure in the elbow 31 then acts through the connection 73 and retains the piston 39 in its raised position which keeps the relief valve 34 closed. The relief valve 34 being closed, fluid admitted into the penstock and the spiral casing or nozzle pipe accordingly builds up pressure and the only path by which such pressure can be released is through the turbine itself. The shutoff valve in the penstock accordingly need open only at such rate as is necessary to supply the quantity of water required for operation of the turbine and as is determined by the opening of the gate or of the needle valve.

It will be understood from the preceding description that the present invention provides a pressure regulator which includes a fluid pressure operated relief valve sub-combination comprising the pipe or valve casing 31, 32 and 33, the relief valve 34 and the piston 39 operating within the cylinder 41 and providing the fluid pressure actuated operating means for closing the valve. A dashpot sub-combination by which the relief valve is connected with the gate or the nozzle operating servo-motor and which includes the dashpot cylinder support 61, the dashpot cylinder and the dashpot piston with the yoke 67, the lever 68 and the pushrod 69, all of which have already been specifically described in the patent above identified and, not forming a part of the present invention, accordingly need no further description herein. Such dashpot combination performs in exactly the same manner and has exactly the same functions as described in such patent. The relief valve structure is connected with the dashpot structure by a limited clearance coupling which includes the piston extension 51 formed to provide a chamber in which the disk 54, which is connected with the dashpot piston 66, has a limited movement. The function of such limited clearance coupling is also clearly set forth in the above identified patent and has not been further described herein. The operation of the piston 39 and hence of the valve 34 is controlled by a control valve which includes the valve 74 itself and the connection 72, 73, the passageway 81 and the pipe 82. Closure of the pipe 82 by the valve 74 prevents wastage of water therethrough when the valve 34 is closed. Such wastage is caused by the difference in pressure between the contents of the pipe 82 and of the connection 72 due chiefly to frictional losses in the penstock between the shutoff valve thereof and the elbow 31.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a regulator for limiting pressure variations in the conduit delivering water to a hydraulic turbine, a fluid pressure operable valve connected with the conduit to relieve increases in pressure in the fluid applied to the turbine, and hydraulically operable means to insure closing of said valve before opening of the turbine gate.

2. In a regulator for limiting pressure variations in the conduit delivering water to a hydraulic turbine, a fluid pressure operable valve connected with the conduit to relieve increases in pressure in the fluid applied to the turbine, the conduit providing a main source of pressure for connection with the operating means of said relief valve, an auxiliary source of pressure for connection with the operating means of said relief valve, and means simultaneously controlling connection of both sources of pressure with the operating means of said valve to shut off the source of auxiliary pressure dependent on the pressure in the conduit.

3. In a regulator for limiting pressure variations in the conduit delivering water to a hydraulic turbine, a fluid pressure operable valve connected with the conduit to relieve increases in pressure in the fluid applied to the turbine, the conduit providing a main source of pressure for connection with the operating means of said relief valve, an auxiliary source of pressure for connection with the operating means of said relief valve, and means operable by the pressure upstream of said relief valve to simultaneously control connection of both the main and the auxiliary sources of pressure supply to the operating means of said relief valve to initiate closing thereof by connection of the auxiliary source and to complete closing thereof by connection of the main source of pressure.

4. In a regulator for limiting pressure variations in the conduit delivering water to a hydraulic turbine, a fluid pressure operable valve connected with the conduit to relieve increases in pressure in the fluid applied to the turbine, the conduit providing a main source of pressure for connection with the operating means of said relief valve, an auxiliary source of pressure for connection with the operating means of said relief valve, and a valve to control connection of both the main and the auxiliary sources of pressure supply to shut off the source of auxiliary pressure dependent on the pressure in the conduit, said valve being mechanically operable in one direction and hydraulically operable in another direction by pressure ahead of said relief valve.

5. In a regulator for limiting pressure variations in the conduit delivering water to a hydraulic turbine, a valve connected with the conduit to relieve increases in pressure in the fluid supplied to the turbine, a fluid pressure operable servomotor operable to close said relief valve, the conduit providing a main source of pressure for operation of said servomotor, an auxiliary source of pressure for connection with said servomotor, and means operable by pressure ahead of said relief valve to shut off the source of auxiliary pressure supply dependent on the pressure of the main source of pressure supply.

6. In a regulator for limiting pressure variations in the conduit delivering water to a hydraulic turbine, a valve connected with the conduit to relieve increases in pressure in the fluid supplied to the turbine, a fluid pressure operable servomotor connected with and operable to close said relief valve, the conduit providing a main source of pressure for operation of said servomotor, an auxiliary source of pressure for connection with said servomotor, and a valve controlling connection of both the main and the auxiliary sources of pressure to initiate operation of said servomotor by connection of the auxiliary pressure source and to complete operation of said servomotor by connection of the main pressure source.

7. In a regulator for limiting pressure variations in the conduit delivering water to a hydraulic turbine, a valve connected with the conduit to relieve increases in pressure in the fluid supplied to the turbine, a fluid pressure operable servomotor operable to close said relief valve, a connection between the space ahead of said relief valve and said servomotor, a second connection between the supply conduit to the turbine and said servomotor, and means simultaneously controlling both of said connections to control operation of said servomotor dependent on the pressure ahead of said relief valve.

8. In a regulator for limiting pressure variations in the conduit delivering water to a hydraulic turbine, a valve connected with the conduit to relieve increases in pressure in the fluid supplied to the turbine, a fluid pressure operable servomotor connected with and operable to close said relief valve, a connection between the space ahead of said relief valve and said servomotor, a second connection between the supply conduit to the turbine and said servomotor, and a valve mechanically operable in one direction and hydraulically operable in another direction to control both of said connections and thereby to control operation of said servomotor dependent on the pressure upstream of said relief valve.

ARNOLD PFAU.